(12) United States Patent (10) Patent No.: US 7,074,508 B2
Ajan (45) Date of Patent: Jul. 11, 2006

(54) MAGNETIC RECORDING MEDIUM INCLUDING AT LEAST ONE SUPERPARAMAGNETIC LAYER AND MAGNETIC STORAGE APPARATUS

(75) Inventor: Antony Ajan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/914,960

(22) Filed: Aug. 10, 2004

(65) Prior Publication Data

US 2005/0048325 A1    Mar. 3, 2005

Related U.S. Application Data

(63) Continuation of application No. PCT/JP02/03205, filed on Mar. 29, 2002.

(51) Int. Cl.
*G11B 5/66* (2006.01)

(52) U.S. Cl. ............ 428/829; 428/830; 428/828.1

(58) Field of Classification Search ............ None
See application file for complete search history.

(56) References Cited

U.S. PATENT DOCUMENTS

| | | | | |
|---|---|---|---|---|
| 6,495,252 B1 * | 12/2002 | Richter et al. | ............ | 428/336 |
| 6,602,612 B1 | 8/2003 | Abarra et al. | ............ | 428/611 |
| 6,645,646 B1 | 11/2003 | Umeda et al. | ......... | 428/694 TS |
| 6,689,495 B1 | 2/2004 | Sato et al. | ......... | 428/694 TM |
| 6,830,824 B1 * | 12/2004 | Kikitsu et al. | ............ | 428/828.1 |

FOREIGN PATENT DOCUMENTS

| | | |
|---|---|---|
| EP | 1 059 629 | 12/2000 |
| JP | 10-97924 | 4/1998 |
| JP | 2001-056924 | 2/2001 |
| JP | 2002-063714 | 2/2002 |
| WO | WO 98/48413 | 10/1998 |

OTHER PUBLICATIONS

Abarra et al., "Longitudinal magnetic recording media with thermal stablilization layers", Applied Physics Letters, vol. 77, No. 16, pp. 2581-2583, Oct. 16, 2000.

(Continued)

*Primary Examiner*—Kevin M. Bernatz
(74) *Attorney, Agent, or Firm*—Greer, Burns & Crain, Ltd.

(57) ABSTRACT

A magnetic recording medium has a base structure, and a synthetic ferrimagnetic structure which is disposed on the base structure and forms a recording layer. The synthetic ferrimagnetic structure includes at least a bottom magnetic layer and a top magnetic layer which are antiferromagnetically coupled via a nonmagnetic spacer layer. The bottom magnetic layer is made of a superparamagnetic layer, and the top magnetic layer is made of a ferromagnetic material. Magnetic moment orientations of the bottom and top magnetic layers are antiparallel at remanent state where an external applied magnetic field is zero. This is achieved since the bottom magnetic layer is in a reverse saturated state due to exchange coupling at remanence, though coercivity is zero for bottom magnetic layer.

18 Claims, 11 Drawing Sheets

OTHER PUBLICATIONS

Fullerton et al., "Antiferromagnetically coupled magnetic media layers for thermally stable high-density recording", Applied Physics Letters, vol. 77, No. 23, pp. 3806-3808, Dec. 4, 2000.

Acharya et al. "Contribution of the magnetic anisotropy of the stabilization layer to the thermal stability of synthetic ferromagnetic media", Applied Physics Letters, vol. 80, No. 1, pp. 85-87, Jan. 7, 2002.

D.T. Margulies, et al. "Interlayer Coupling and Magnetic Reversal of Antiferromagnetically Coupled Media", Applied Physics Letters, vol. 80, No. 1, pp. 91-93, Jan. 7, 2002 (XP1092642).

* cited by examiner

MAGNETIC RECORDING MEDIUM INCLUDING AT LEAST ONE SUPERPARAMAGNETIC LAYER AND MAGNETIC STORAGE APPARATUS

This application is a continuation of and claims the benefit of a PCT International Application No. PCT/JP02/03205 filed Mar. 29, 2002 in the English language, in the Japanese Patent Office, the disclosure of which is hereby incorporated by reference.

The PCT International Application No. PCT/JP02/03205 was published under International Publication No. WO03/083841A1 in the English language on Oct. 9, 2003.

BACKGROUND OF THE INVENTION

1. Field of the Invention

The present invention generally relates to magnetic recording media and magnetic storage apparatuses, and more particularly to a longitudinal magnetic recording medium which uses a thermally unstable layer to stabilize a recording magnetic layer for improving the thermal stability of the recording magnetic layer, and to a magnetic storage apparatus which uses such a magnetic recording medium.

2. Description of the Related Art

The demand for increased storage capacity of magnetic recording media has resulted in the development of the magnetic thin film disk by suitable scaling of both growth and magnetic properties, and also innovations in designing, as may be understood from recently developed Synthetic Ferrimagnetic Media (SFM) proposed in a Japanese Laid-Open Patent Application No. 2001-56924, and findings reported in Abarra et al., "Longitudinal magnetic recording media with thermal stabilization layers", Applied Physics Letters, Vol. 77, No. 16, pp. 2581-2583, Oct. 15, 2000, and Fullerton et al., "Antiferromagnetically coupled magnetic media layers for thermally stable high-density recording", Applied Physics Letters, Vol.77, No.23, pp.3806-3808, Dec. 4, 2000.

As the magnetic recording density become very high and the amount of information stored per unit area becomes extremely large, the requirement of scaling down on the magnetic recording layer dimension is unavoidable. Making the magnetic recording layer thinner is advantageous in reducing the grain sizes and also reducing the transition parameter accordingly. However, this cannot go on for long since the grain size reduction and hence the reduction in anisotropy energy becomes too small which can be easily overcome by thermal energy at a given temperature (normally room temperature). In order to achieve alternative approaches in design, it is necessary to further improve the magnetic recording medium such as the synthetic ferrimagnetic media proposed in the Japanese Laid-Open Patent Application No.2001-56924.

SUMMARY OF THE INVENTION

Accordingly, it is a general object of the present invention to provide a novel and useful magnetic recording medium and magnetic storage apparatus, in which the problems described above are substantially reduced.

Another and more specific object of the present invention is to have an improvement in understanding and proposing a different type of magnetic layer used to stabilize a top magnetic recording layer of a synthetic ferrimagnetic medium (SFM) having a synthetic ferrimagnetic structure. A thin superparamagnetic layer is used to achieve this object instead of a ferromagnetic layer. By employing a suitable superparamagnetic layer for this purpose, it is possible to increase the density of recording further by suitably moving down to lower tBr (Gμm) ranges.

A further object of the present invention is to improve upon the media performance keeping the same level or more of thermal stability of the magnetic recording layer. Moreover, with the present invention, it is important to note that the same level or improvement in the signal-to-noise ratio (SNR) is also achieved in comparison to the conventional single layer media.

Another object of the present invention is to make use of the coupling strength and the interlayer properties of a bottom magnetic layer of the synthetic ferrimagnetic structure to enhance the properties of SFM.

Still another object of the present invention is to provide a magnetic recording medium comprising a base structure, and a synthetic ferrimagnetic structure, disposed on the base structure, and forming a recording layer, where the synthetic ferrimagnetic structure includes at least a bottom magnetic layer and a top magnetic layer which are antiferromagnetically coupled via a nonmagnetic spacer layer, the bottom magnetic layer is made of a superparamagnetic layer, the top magnetic layer is made of a ferromagnetic material, and magnetic moment orientations of the bottom and top magnetic layers are antiparallel at remanent state where an external applied magnetic field is zero.

A further object of the present invention is to provide a magnetic storage apparatus comprising at least one magnetic recording medium having a base structure and a synthetic ferrimagnetic structure disposed on the base structure and forming a recording layer, and a transducer which writes information on and reproduces information the magnetic recording medium, where the synthetic ferrimagnetic structure includes at least a bottom magnetic layer and a top magnetic layer which are antiferromagnetically coupled via a nonmagnetic spacer layer, the bottom magnetic layer is made of a superparamagnetic layer, the top magnetic layer is made of a ferromagnetic material, and magnetic moment orientations of the bottom and top magnetic layers are antiparallel at remanent state where an external applied magnetic field is zero.

According to the present invention, it is possible to realize a magnetic recording medium and a magnetic storage apparatus using a superparamagnetic layer as the stabilizing layer. This stabilizing layer allows the magnetization of the top magnetic layer to stabilize thermally in the SFM systems. If a suitable superparamagnetic layer is used for the stabilizing layer, it helps improve the SNR and enable achieving a high density recording of above 100 Gbits/Sq.inch, along with the required thermal stability at lower tBr values. This tBr reduction keeping the improved thermal stability and the improved SNR is a key factor of the present invention.

Other objects and features of the present invention will be apparent from the following detailed description when read in conjunction with the accompanying drawings.

DESCRIPTION OF THE PREFERRED EMBODIMENTS

Figure 1:
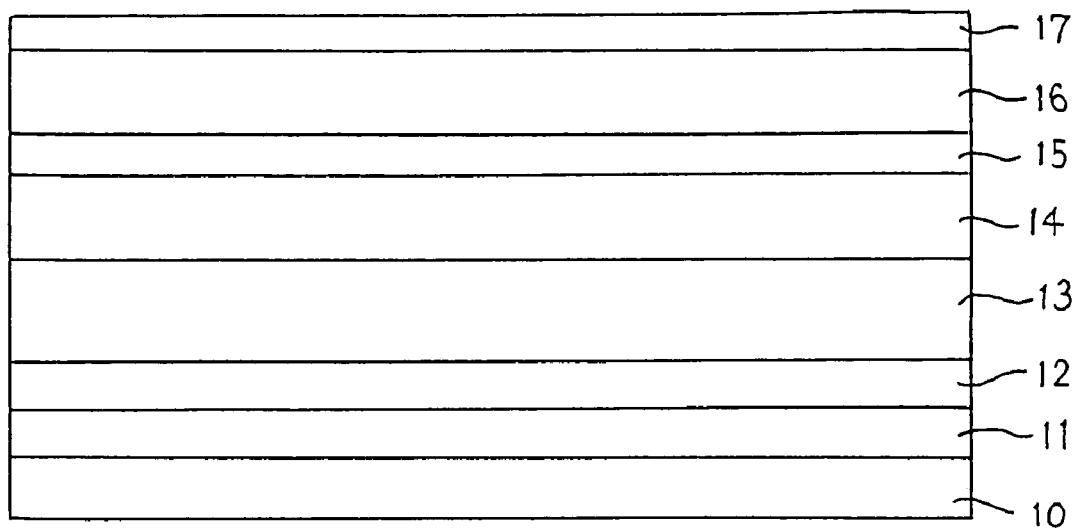
FIG. 1 is a cross sectional view showing an important part of a first embodiment of the magnetic recording medium according to the present invention.

The present invention is applied to the Synthetic Ferrimagnetic Media (SFM) described above for a case where two ferromagnetic layers are coupled in antiparallel directions through a nonmagnetic spacer layer made of Ru, for example. The present invention contributes to an additional regime in which a lower layer of the coupled ferromagnetic layers is made of a superparamagnetic layer.

To provide consistent references within the current disclosure, the following definitions will be used. The definitions are obtained from "A Dictionary of Physical Sciences", Towman & Allanheld, 1983.

The "moment" refers to the turning effect of a force or system of forces about an axis. A single force has a moment equal to the product of the force and the perpendicular distance from the axis to the force's line of action.

The "paramagnetism" refers to a type of magnetic behavior in which the material has a fairly low positive susceptibility that is inversely proportional to temperature. A paramagnetic sample will tend to move towards an applied magnetic field. The effect is caused by the spins of unpaired electrons in the atoms or molecules, which give the atoms a magnetic moment. The effect of paramagnetism always overwhelms the diamagnetic behaviors of the solid.

The "ferromagnetism" refers to a type of magnetic behavior in which the material has a very high susceptibility that depends on temperature. Ferromagnetism is caused by unpaired electrons, as in paramagnetism. These act as small elementary magnets and in ferromagnetic materials they are aligned parallel to each other within regions of the solid called domains by intermolecular forces known as exchange forces. Each domain can thus be thought of as a small magnet. In an unmagnetized sample the domains are oriented at random so the sample has no net magnetic moment. If an external field is applied, the elementary magnets tend to align along its direction and domains whose magnetic moments are directed along the field grow at the expense of neighboring domains. When the field is large enough, all the elementary magnets point in the direction of the field and the sample is saturated.

The definition of "superparamagnetism" is obtained from B. D. Cullity, "Magnetism and Magnetic Materials", Addison Wesley Publishing Company Inc., 1972. When the grain sizes of a ferromagnet decreases beyond a certain value, the coercivity becomes zero because the thermal energy of the grain overcomes any of the energies present in the grain (like anisotropy energy). This thermal energy is strong enough to spontaneously demagnetize previously magnetized assembly of particles. Such particles are called superparamagnetic particles.

An operational definition of "superparamagnetism" would include at least two requirements. First, the magnetization curve should show no hysteresis, since that is not a thermal equilibrium property. Second, except for particle interaction effects, the magnetization curve for an isotropic sample must be temperature dependent to the extent that curves taken at different temperatures must approximately superimpose when plotted against H/T after correction for the temperature dependence of the spontaneous magnetization, where H denotes the applied field and T denotes the temperature.

A magnetic recording medium according to the present invention is suited for longitudinal high-density recording with increased thermal stability and better recording performance for extending the current recording limits preferably over 100 Gbits/Sq.inch. More particularly, the magnetic recording medium according to the present invention uses a thermally unstable layer to stabilize a recording magnetic layer for improving the thermal stability of the recording magnetic layer. This thermally unstable layer, that is, a superparamagnetic layer, may be deposited on a mechanically textured or amorphous glass substrate with an underlayer structure used normally for the longitudinal recording. This structure is used for the SFM where the two ferromagnetic layers of the magnetic recording medium are separated by a nonmagnetic spacer layer made of Ru or the like, and magnetizations thereof are coupled antiferromagnetically in the remanent state. The present invention introduces a superparamagnetic layer instead of a ferromagnetic layer to achieve stability of the top ferromagnetic layer. By suitably selecting the material used for the superparamagnetic layer, it is possible to realize a good high-density recording performance with high signal-to-noise ratio (SNR) and good overwrite characteristic.

The superparamagnetism of the superparamagnetic layer is at 273 K or above. For a given material to be superparamagnetic it is necessary to specify the temperature of measurement and also the magnetic field dependence of magnetization of the superparamagnetic layer in this manner. In addition, the superparamagnetic layer has a coercivity Hc of Hc=0 at room temperature or above and measuring time is 1 second or more. Normally, to prove that a particular material is in a superparamagnetic state, it is necessary to experimentally see that coercivity Hc is zero and has a finite magnetization. However, since the coercivity Hc is a parameter which is time dependent also, it is necessary to specify the time of measurement also. If the coercivity Hc is zero at 1 second, the coercivity Hc would be zero all higher time scales, where the time scale refers to a rate at which the external magnetic field applied on the magnetic recording medium is changed.

However, the most important parameter to determine is the volume (or size of the grains) of the superparamagnetic layer, as will be described later. Superparamagnetism sets in at any temperature when the volume (grain sizes) is reduced below a particular value. This volume (or grain size) where the superparamagnetism can set in depends on the material used for the superparamagnetic layer.

FIG. 1 is a cross sectional view showing an important part of a first embodiment of the magnetic recording medium according to the present invention. In FIG. 1 and FIGS. 4 through 6 which will be described later, the thicknesses of the various layers are not scaled.

The magnetic recording medium shown in FIG. 1 includes a substrate 10 made of Al, glass or any suitable substrate material. A seed layer 11 is formed on the substrate 10. In this embodiment, the seed layer 11 may be made of NiP, Cr, Co alloys such as CoNiZr and CoNbZr, or alloys thereof, and preferably has a thickness in a range of 5 nm to 100 nm. The seed layer 11 may be formed by a single layer or a combination of two or more layers stacked on top of one another with different compositions. An underlayer 12 is formed on the seed layer 11. The underlayer 12 may be made of Cr or alloys thereof such as CrV, CrW and CrMo. For example, if the underlayer 12 is made of CrMo, CrMoW, CrV or CrW, the Mo-content, W-content or V-content is selected in a range of 1 at. % to 30 at. %, and the Cr-content forms the remaining at. %. The underlayer 12 may be formed by a single layer or a combination of two or more layers stacked on top of one another with different compositions. The requirement for the underlayer 12 and the seed layer 11 for this embodiment of the magnetic recording medium is to provide Co (11–20) orientation of the subsequent hexagonal magnetic layers.

In addition to the seed layer 11 and the underlayer 12, it is preferable to provide an intermediate layer 13 made of CoCr with a Cr content is 25 at. %≦Cr≦45 at. %, or alloys of CoCr such as CoCrTa with a Cr content of 10 at. % to 40 at. % and a Ta content of 1 at. % to 10 at. %, in order to enhance the lattice matching between the underlayers (11, 12 and 13) and subsequent superparamagnetic and ferromagnetic recording layers 14 and 16 which are separated by a nonmagnetic spacer layer 15. For example, the nonmagnetic spacer layer 15 is made of Ru, Rh, Ir, Cr, Mo, Nb, Ta, Cu, Re or alloys thereof. A protective layer 17 made of sputtered C or chemical vapor-deposited C and having a thickness of 4 nm to 5 nm is formed on top of the magnetic layers for protection from chemical and mechanical degradation. In this embodiment, the protective layer 17 is formed on the ferromagnetic layer 16. Of course, the protective layer 17 may have a two-layer structure which is made up of a C layer and a lubricant layer formed on the C layer.

The underlayers (11, 12 and 13), the superparamagnetic layer 14 and the ferromagnetic recording layer 16 may be formed by dc sputtering processes with a substrate temperature Ts satisfying 150° C.<Ts<300° C., a substrate bias voltage Vb satisfying 0<Vb<−300 V, in the presence of inert gas pressure (usually Ar) of 2 mTorr to 100 mTorr.

In the case of mechanically textured substrates of NiP-coated Al or glass substrates, a preferred orientation of Co c-axis and Cr<110> occurs along the circumferential texture. In this case, both the SNR and the thermal stability of the recorded bit are improved.

Figure 4:
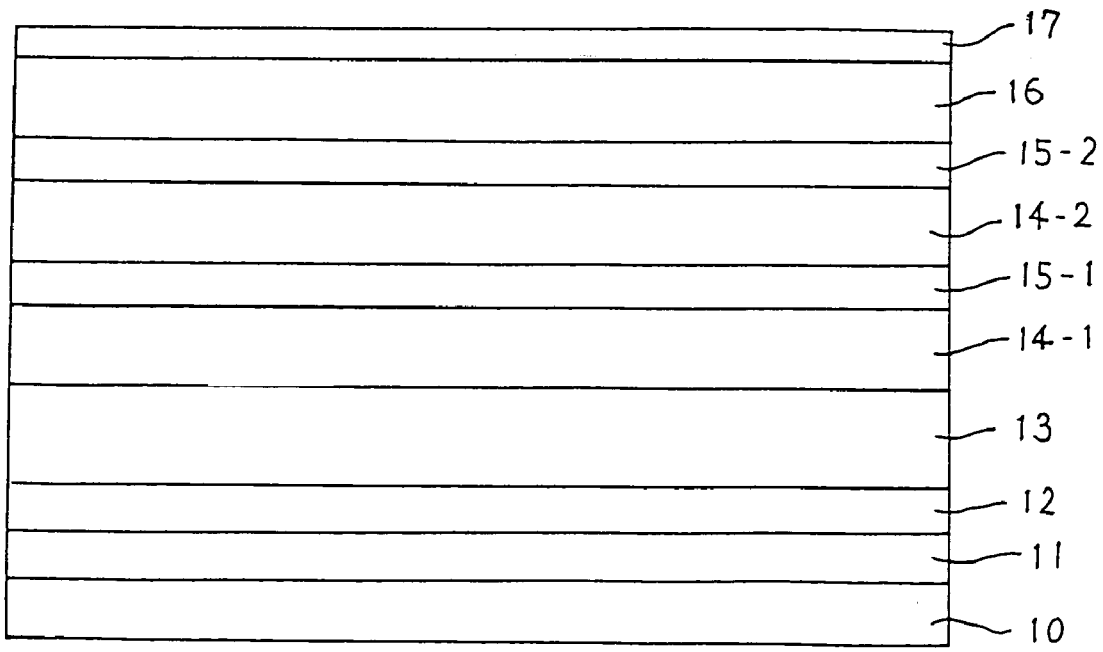
FIG. 4 is a cross sectional view showing an important part of a second embodiment of the magnetic recording medium according to the present invention.

FIG. 4 is a cross sectional view showing an important part of a second embodiment of the magnetic recording medium according to the present invention. In FIG. 4, those parts which are the same as those corresponding parts in FIG. 1 are designated by the same reference numerals, and a description thereof will be omitted. As shown in FIG. 4, a first superparamagnetic layer 14-1 is formed on the underlayer 12 or the intermediate layer 13, and a first nonmagnetic spacer layer 15-1 is formed on the first superparamagnetic layer 14-1. In addition, a second superparamagnetic layer 14-2 is formed on the first nonmagnetic spacer layer 15-1, and a second nonmagnetic spacer layer 15-2 is formed on the second superparamagnetic layer 14-2. The ferromagnetic layer 16 is formed on the second nonmagnetic spacer layer 15-2.

Figure 5:
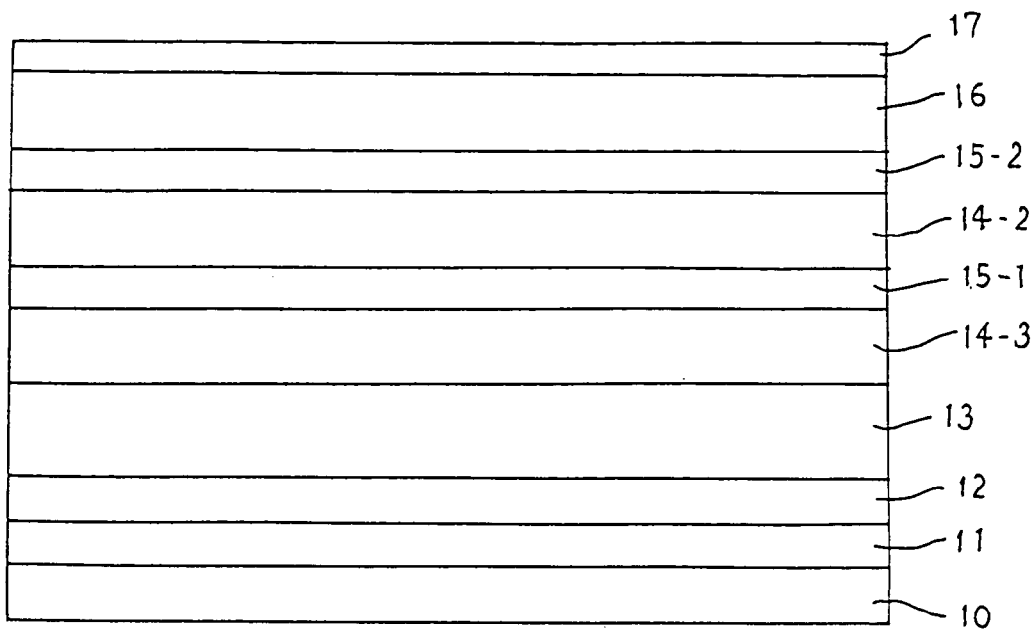
FIG. 5 is a cross sectional view showing an important part of a third embodiment of the magnetic recording medium according to the present invention.

FIG. 5 is a cross sectional view showing an important part of a third embodiment of the magnetic recording medium according to the present invention. In FIG. 5, those parts which are the same as those corresponding parts in FIG. 4 are designated by the same reference numerals, and a description thereof will be omitted. As shown in FIG. 5, a ferromagnetic layer 14-3 is provided in place of the first superparamagnetic layer 14-1 shown in FIG. 4.

Figure 6:
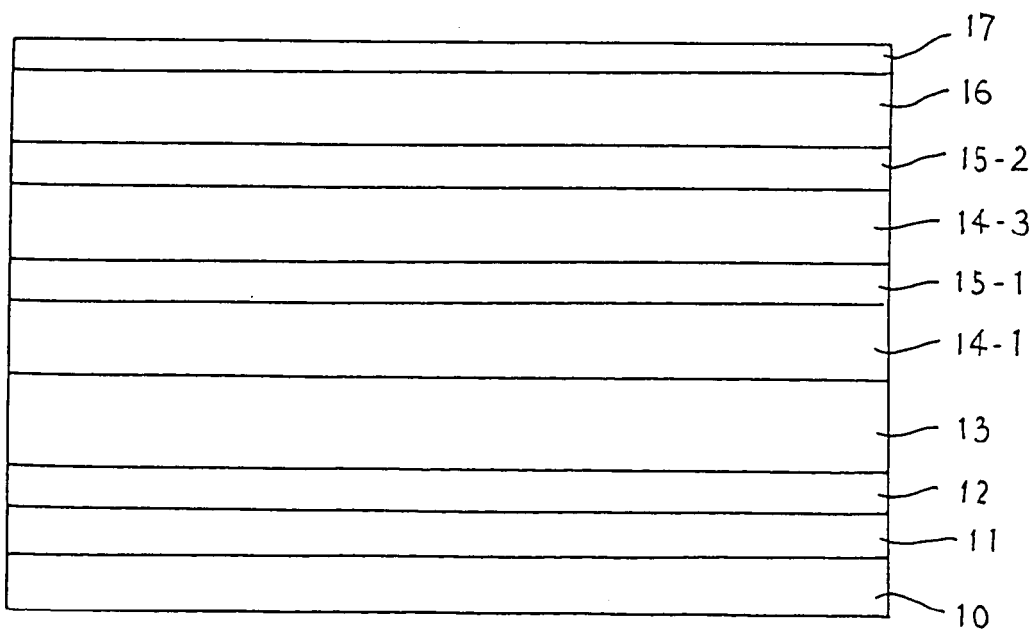
FIG. 6 is a cross sectional view showing an important part of a fourth embodiment of the magnetic recording medium according to the present invention.

FIG. 6 is a cross sectional view showing an important part of a fourth embodiment of the magnetic recording medium according to the present invention. In FIG. 6, those parts which are the same as those corresponding parts in FIGS. 4 and 5 are designated by the same reference numerals, and a description thereof will be omitted. As shown in FIG. 6, a ferromagnetic layer 14-3 is provided in place of the superparamagnetic layer 14-2 shown in FIG. 4.

In FIG. 1 and FIGS. 4 through 6, it is assumed for the sake of convenience that the superparamagnetic layers 14 and 14-1 are made of a superparamagnetic layer (material) L1, the superparamagnetic layer 14-2 is made of a superparamagnetic layer (material) L1-1, the ferromagnetic layer 14-3 is made of a ferromagnetic layer (material) L1', and the ferromagnetic layer 16 is made of a ferromagnetic layer (material) L2.

In the first through fourth embodiments described above, the magnetic structure where the actual magnetic recording takes place is formed of multiple layers. As described above, the Japanese Laid-Open Patent Application No.2001-56924 proposes the Synthetic ferrimagnetic medium (SFM) having the unique multilayer synthetic ferrimagnetic structure in order to overcome the destabilisation of the recorded bits caused by the thermal energy when the particle sizes in the magnetic recording medium goes lower and lower. Since it was essential to overcome this thermal fluctuation for a higher density recording, the SFM proved to be effective.

Figure 2:
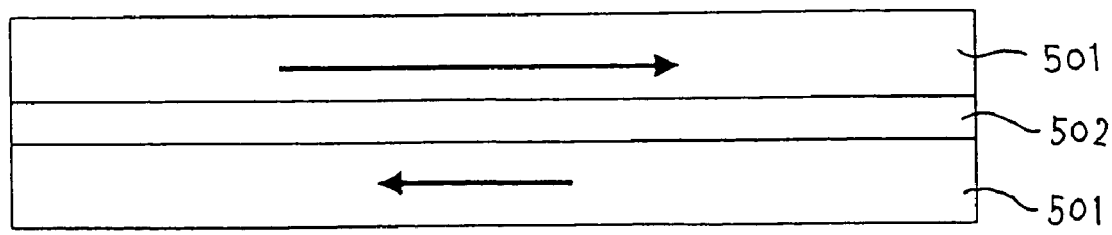
FIG. 2 is a diagram for explaining an antiferromagnetic coupling scheme used for a two-layer synthetic ferrimagnetic structure in the state of magnetic moments at remanent position, that is, when the applied external magnetic field is zero.
Figure 3:
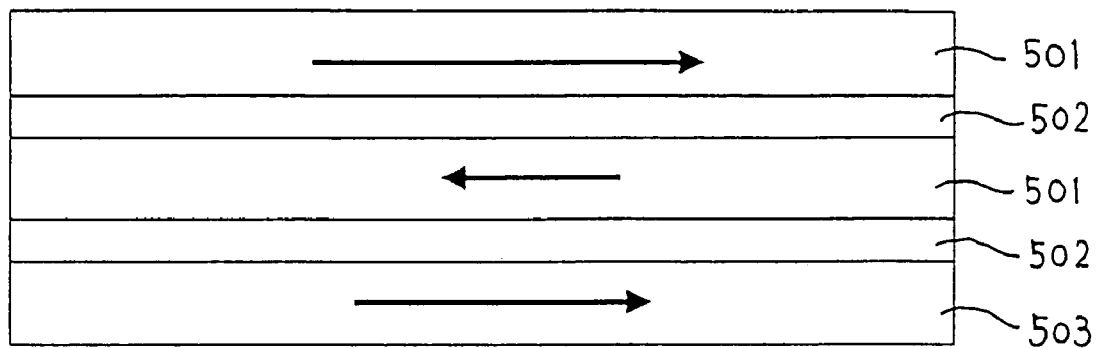
FIG. 3 is a diagram for explaining an antiferromagnetic coupling scheme used for a three-layer synthetic ferrimagnetic structure in the state of magnetic moments at remanent position, that is, when the applied external magnetic field is zero.

In the SFM having the synthetic ferrimagnetic structure described in the Japanese Laid-Open Patent Application No.2001-56924, two ferromagnetic layers 501 are antiferromagnetically coupled through a nonmagnetic spacer layer 502 made of Ru, for example, as shown in FIGS. 2 and 3. FIG. 2 is a diagram for explaining an antiferromagnetic coupling scheme used for a two-layer synthetic ferrimagnetic structure in the state of magnetic moments at remanent position, that is, when the applied external magnetic field is zero. Similarly, FIG. 3 is a diagram for explaining an antiferromagnetic coupling scheme used for a three-layer synthetic ferrimagnetic structure in the state of magnetic moments at remanent position, that is, when the applied external magnetic field is zero. In FIG. 3, an additional ferromagnetic layer 503 is provided. By employing the antiferromagnetic coupling, it is possible to reduce the remanent magnetization and thickness product Mrt, which is essential in order to increase the recording density. Through the antiparallel coupling, it is possible to successfully produce a magnetic recording medium overcoming thermal fluctuation to a large extent maintaining high SNR also. This was an important improvement to the conventional single-layer magnetic recording media having considerably lower Mrt values.

In the first embodiment described above, for example, the superparamagnetic layer 14 shown in FIG. 1 is introduced in place of the bottom ferromagnetic layer 501 shown in FIG.2 in the synthetic ferrimagnetic structure. The two cases where the superparamagnetic layer is used and the ferromagnetic layer is used, can be differentiated by looking at the magnetization loop for obtaining the coercivity especially from the minor loop, and also the temperature dependence of the magnetization and employing the time of the magnetization measurement. Since the coercivity is an extrinsic parameter of the magnetic recording medium, it is important to characterize by many methods to identify the superparamagnetic regime in comparison to the ferromagnetic region.

The first through fourth embodiments are basically an extension of the SFM. In this case, a bottom superparamagnetic layer, which functions as a stabilizing layer and is made of the layer L1, is superparamagnetic in nature than a top ferromagnetic layer made of the layer L2. The superparamagnetic layer L1 may either be a soft magnetic material or a hard magnetic material. A hard magnetic material would have higher coercivities with reasonably large magnetization. A soft magnetic material would have higher magnetization and very low coercivities. The superparamagnetic nature of the stabilizing layer is due to its finite thickness normally below 5 nm for CoCrPtB compositions and like. According to the investigations made by the present inventor, both structural and recording properties of this embodiment indicated that the technology extended further to the stabilizing layer made of the superparamagnetic layer L1 and still gain advantages of synthetic ferrimagnetic structure. Also, two cases of material dependent aspect of the stabilizing layer emerged.

A first way is to reduce $tB_r$ values using a high Co-containing material and a relatively much lower anisotropy value for the layer L1 forming the stabilizing layer, where t denotes the thickness of the stabilizing layer and $B_r$ denotes the remanent flux. In this case, the high density is achieved along with the stability from the layer L2 forming the top ferromagnetic layer.

A second way is to reduce the remanent magnetization and thickness product Mrt of the magnetic layer using relatively the same or large anisotropy material for the layer L1 or, the layers L1 and L1-1, in comparison to the layer L2. In this case, a $KuV/k_BT$ value of the structure increased substantially from the single layer case where only the top ferromagnetic layer is provided, utilizing anisotropy energy contribution from the stabilizing layer, where Ku is the anisotropy constant of the material, V is the volume and $k_B$ is the Boltzmann's constant.

For example, if the stabilizing layer is made of the superparamagnetic layer L1 with very low Pt or no Pt, then the stability mostly comes from the top ferromagnetic layer made of the layer L2. By increasing the thickness of the stabilizing layer, which is made of the superparamagnetic layer L1 having a suitably high Pt of above 8% and up to 16% or more, then a substantial stability can also be drawn from the stabilizing layer. The reduction of the remanent magnetization and thickness product Mrt is also be easily achieved, since in the antiferromagnetically coupled state at remanence, the stabilizing layer has a high saturated opposite magnetization. Also it is important to mention that for the top ferromagnetic layer a definite value is obtained for the remanent magnetization and thickness product $Mr_1t_1$, and for the stabilizing layer the remanent magnetization and thickness product Mrt would be zero. In spite of this, there is a reduction in the remanent magnetization and thickness product Mrt when the magnetizations are antiparallel, since at remanence, a reverse high saturation magnetic moment from the stabilizing layer helps the reduction.

As far as the growth of the material is concerned, the underlayer structures (Cr or its alloy) have its (002) in-plane, and the magnetic layer for both superparamagnetic and ferromagnetic Co layer would have (11-20) in-plane structure. However, there can be one more growth process possible in which the recording layer is (1010) texture and the corresponding underlayer is (112) texture. This is mainly achieved by using a B2 type material for the seed layers like NiAl or FeAl deposited on suitable substrates like glass or Al.

Due to the high moment characteristics of the stabilizing layer, the reduction of the remanent magnetization and thickness product Mrt is readily achieved while maintaining a large thermal stability. Thermal stability improvement from the single layer material is achieved mainly because of finite anisotropy energy contribution from the stabilizing layer as also explained by Acharya et al. in Appl. Phys. Lett., vol.80, p.85, 2002. Similar to the two-layer or three-layer structures proposed with ferromagnetic layers, a two-layer or three-layer synthetic ferrimagnetic structure utilizing the stabilizing layer can be achieved easily as shown in FIGS. 1 and FIGS. 4 through 6. According to the first through fourth embodiments, the thermal stability and the SNR are improved in comparison to the single layer material as the recording layer.

Figure 10:
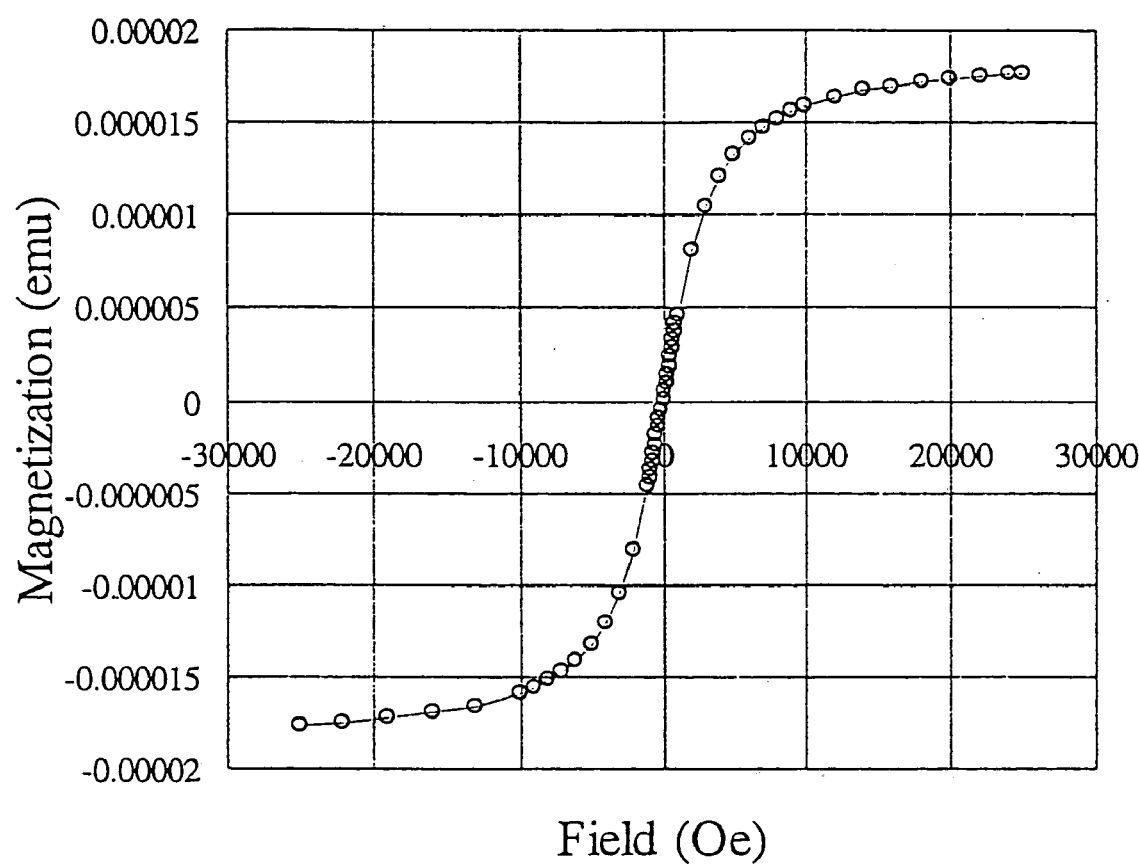
FIG. 10 is a diagram showing magnetization loop and coercivity values when a bottom magnetic layer is superparamagnetic.

The superparamagnetic layer L1 or L1-1 at room temperature, for example, would not have a coercivity and retentivity. However, the superparamagnetic layer L1 or L1-1 will have magnetization at a high applied magnetic field. In other words, when the applied field is zero, the magnetization becomes zero. This typical behavior of superparamagnetic layer L1 or L1-1 is shown in FIG. 10 which will be described later. At room temperature and the at VSM time scale of measurement, the coercivity of the superparamagnetic layer L1 or L1-1 shows a zero value in FIG. 10. On the other hand, in the Japanese Laid-Open Patent Application No.2001-56924, however, a ferromagnetic layer, with a finite coercivity and magnetization, are used to achieve the structure.

Figure 7A:
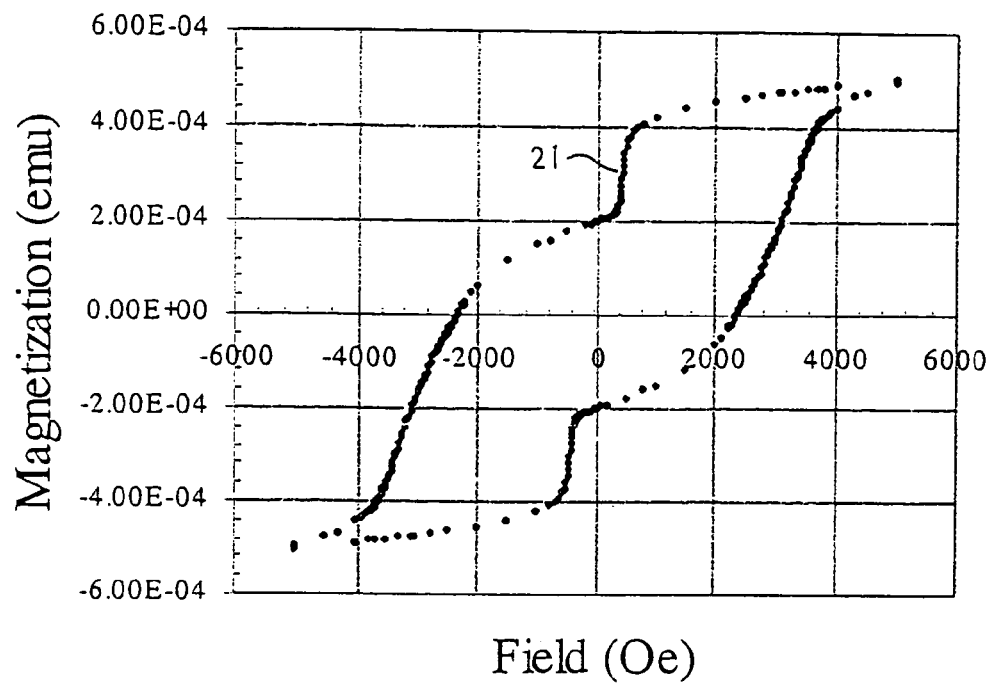
FIG. 7A is a diagrams showing magnetization loop and coercivity values of the synthetic ferrimagnetic structure using a typical ferromagnetic material.
Figure 7B:
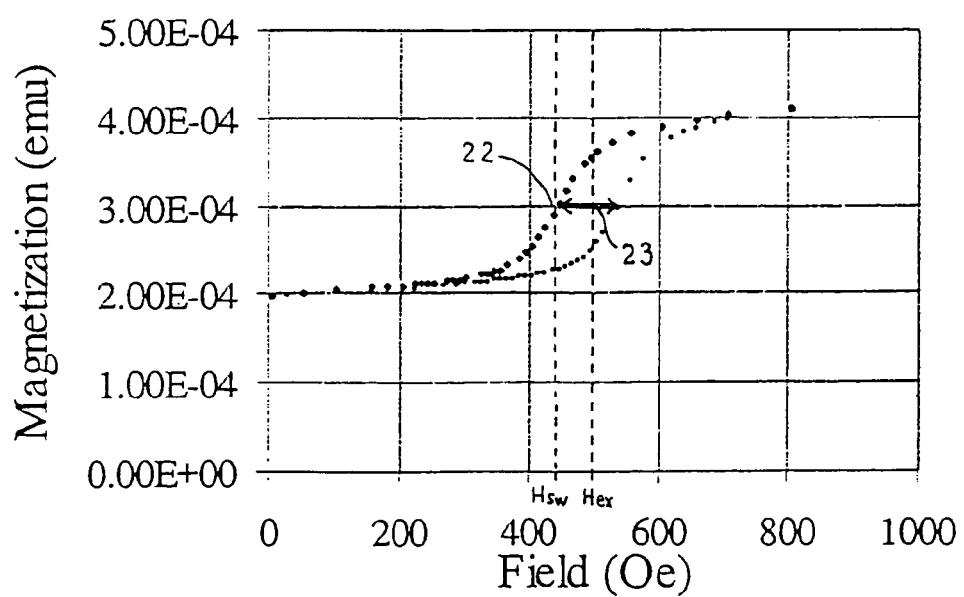
FIG. 7B is a diagram showing magnetization of minor loop and coercivity values of the synthetic ferrimagnetic structure using a typical ferromagnetic material.

FIGS. 7A and 7B show magnetization loop and coercivity values of the synthetic ferrimagnetic structure using a typical ferromagnetic material. In FIG. 7A, the ordinate indicates the magnetization (emu), and the abscissa indicates the applied field (Oe). In FIG. 7B, the ordinate indicates the magnetization (emu) from minor loop, and the abscissa indicates the applied field (Oe).

As explained in the Japanese Laid-Open Patent Application No.2001-56924, the hysteresis loop shown in FIG. 7A has three parts, which corresponds to that for antiferromagnetic coupled systems. In a typical. synthetic ferrimagnetic structure using the ferromagnetic material for the bottom magnetic layer, the minor loop shows that the coercivity is used as the bottom magnetic layer, as indicated by points 21 through 23 in FIGS. 7A and 7B. The points 22 and 23 on the minor loop shown in FIG. 7B are used to characterize an exchange field Hex and a switching field Hsw of the magnetic materials. The switching field Hsw is obtained from a dM/dH curve peak position. On the other hand, the exchange field Hex is experienced by the top magnetic layer from the bottom magnetic layer and is calculated from Hex=J/M*t, where J denotes the antiferromagnetic coupling strength, M denotes the magnetization, and t denotes the thickness of the bottom magnetic layer. The exchange field Hex and the switching field Hsw are different, showing the bottom magnetic layer is ferromagnetic. This is shown in FIG. 7B as the minor loop.

Figure 8A:
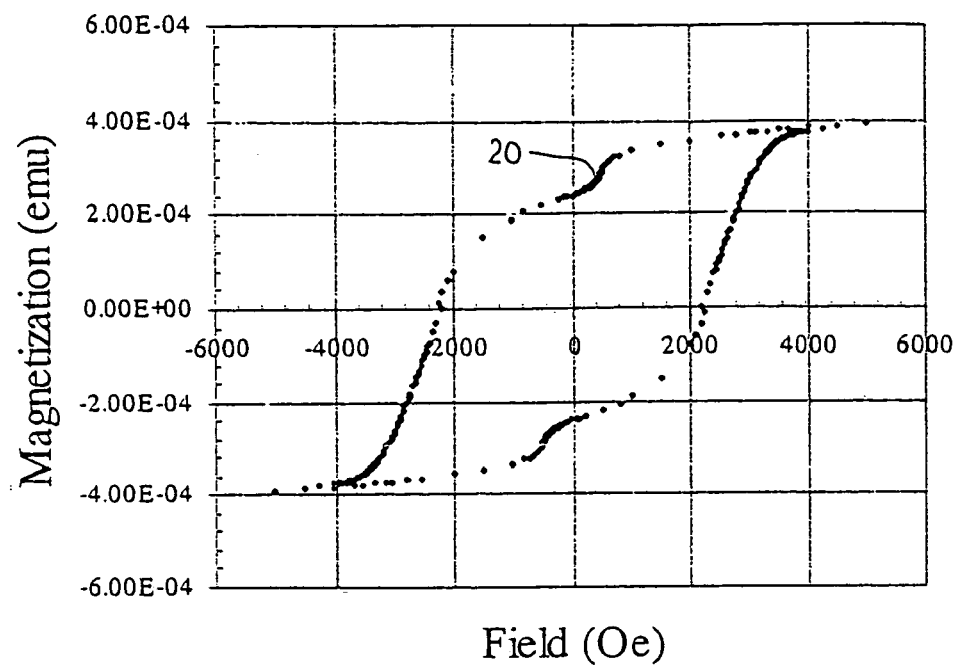
FIG. 8A is a diagram showing magnetization loop and coercivity values of the synthetic ferrimagnetic structure using a typical superparamagnetic material.
Figure 8B:
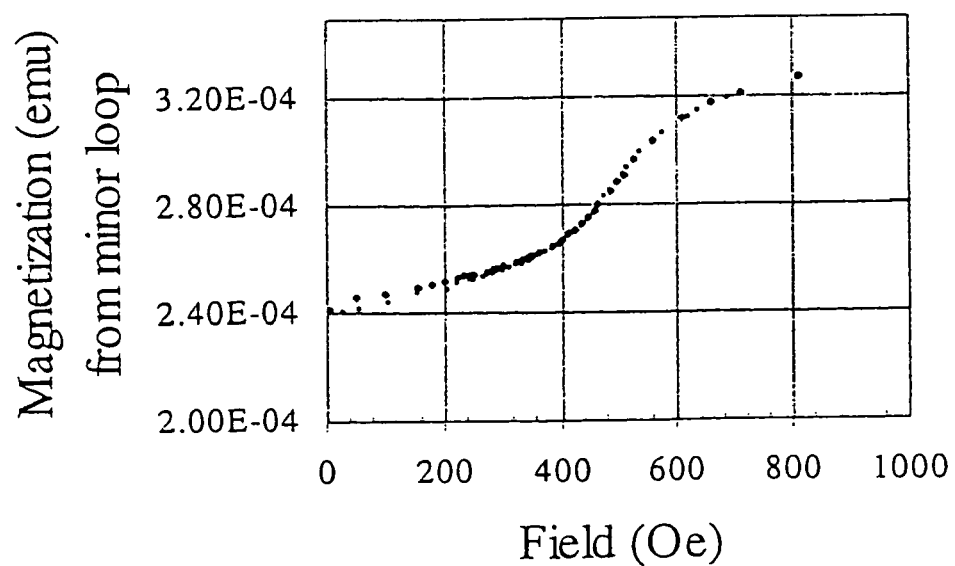
FIG. 8B is a diagram showing magnetization of minor loop and coercivity values of the synthetic ferrimagnetic structure using a typical superparamagnetic material.

On the other hand, FIGS. 8A and 8B show magnetization loop and coercivity values of the synthetic ferrimagnetic structure using a typical superparamagnetic layer. In FIG. 8A, the ordinate indicates the magnetization (emu), and the abscissa indicates the applied field (Oe). In FIG. 8B, the ordinate indicates the magnetization (emu) from minor loop, and the abscissa indicates the applied field (Oe).

The exchange field values which are obtained from the minor loop shown in FIG. 8B shows that the bottom magnetic layer is superparamagnetic, and has a coercivity which is zero. In this way, it is possible to easily identify the type of material used in the synthetic ferrimagnetic structure. Also, it should be noted that the grain sizes of the superparamagnetic layer are small enough so that it contains only a single domain. The characteristics of such a material would be to identify zero coercivity. Since the energy barrier of the grain or a collection of grains in the superparamagnetic layer is very low, the $K_uV/K_BT$ value of the superparamagnetic layer would be less than 25. Since the thermal energy can easily overcome any anisotropic energy present in the material in the absence of external field, there will be no magnetization. In other words, the squareness S become S=0.

Figure 9:
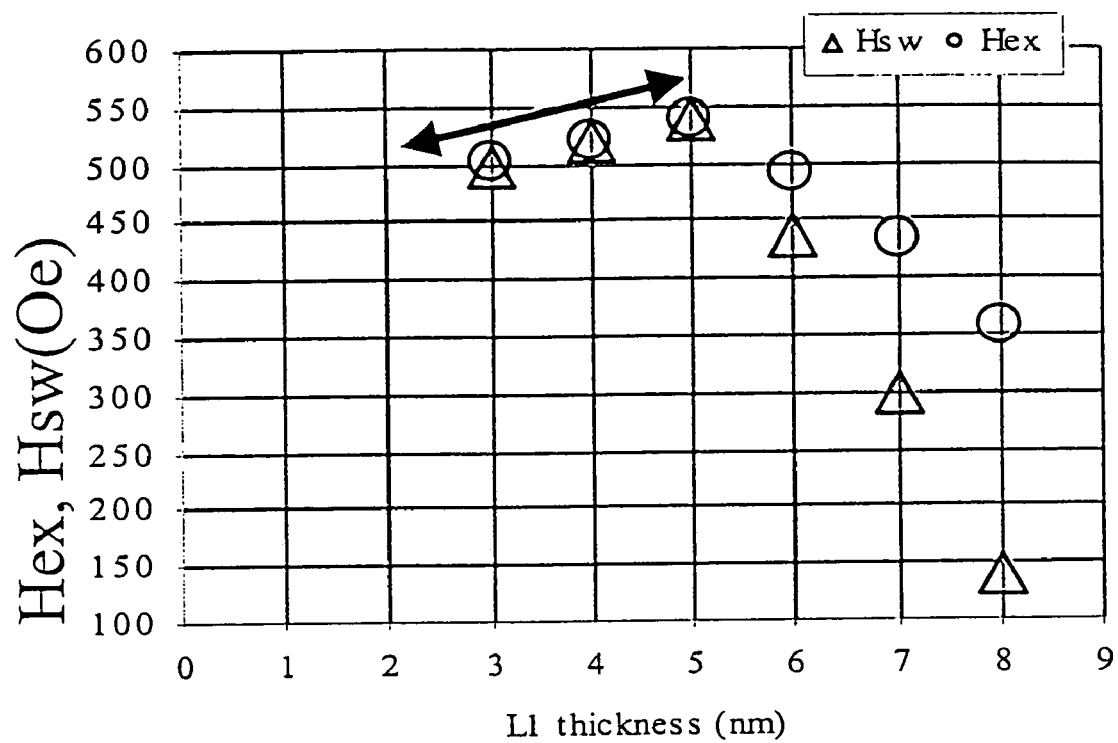
FIG. 9 is a diagram showing exchange field values for the Hex values as the thickness of superparamagnetic layer increases and then reaches a ferromagnetic state.

FIGS. 9 and 10 are diagrams showing magnetization loop and coercivity values when the bottom magnetic layer is superparamagnetic. In FIG. 9, the ordinate indicates the exchange field Hex and the switching field Hsw in Oe, and the abscissa indicates the thickness of the bottom magnetic layer, that is, the superparamagnetic layer (stabilizing layer). "○" indicates the exchange field Hex, and "Δ" indicates the switching field Hsw. In FIG. 9, typical values of the exchange field Hex and the switching field Hsw are show for cases where the stabilizing layer is superparamagnetic and ferromagnetic. The Hsw and Hex values which are obtained from the hysteresis loop and minor loop measurement indicate such behavior. If Hsw =Hex (at point 24), then the bottom magnetic layer is a superparamagnetic layer which is indicated earlier in FIGS. 8A and 8B as a sign of it. The Hsw and Hex values are usually obtained from the hysteresis loop measurement using SQUID, VSM or any other magnetometers. In FIG. 9 for the bottom magnetic layer thickness of up to 5 nm, the particle sizes are small enough to be in the single domain superparamagnetic state.

Due to the finite size effect, the magnetization value decreases as the bottom magnetic layer thickness is reduced below 10 nm. This happens mainly because of the spindensity reduction at the interface of magnetic layer and the nonmagnetic spacer layer. Accordingly, it may be seen that the bottom magnetic layer thickness t is preferably in a range of 0<t<10 nm. Since the superparamagnetic state occurs in single domain particles, the drop in the magnetization value also occurs due to the reduction in the bottom magnetic layer thickness, as may be seen from FIGS. 9 and 10. FIG. 9 is a diagram showing exchange field values for the Hex values as the thickness of superparamagnetic layer increases and then reaches a ferromagnetic state.

Figure 11:
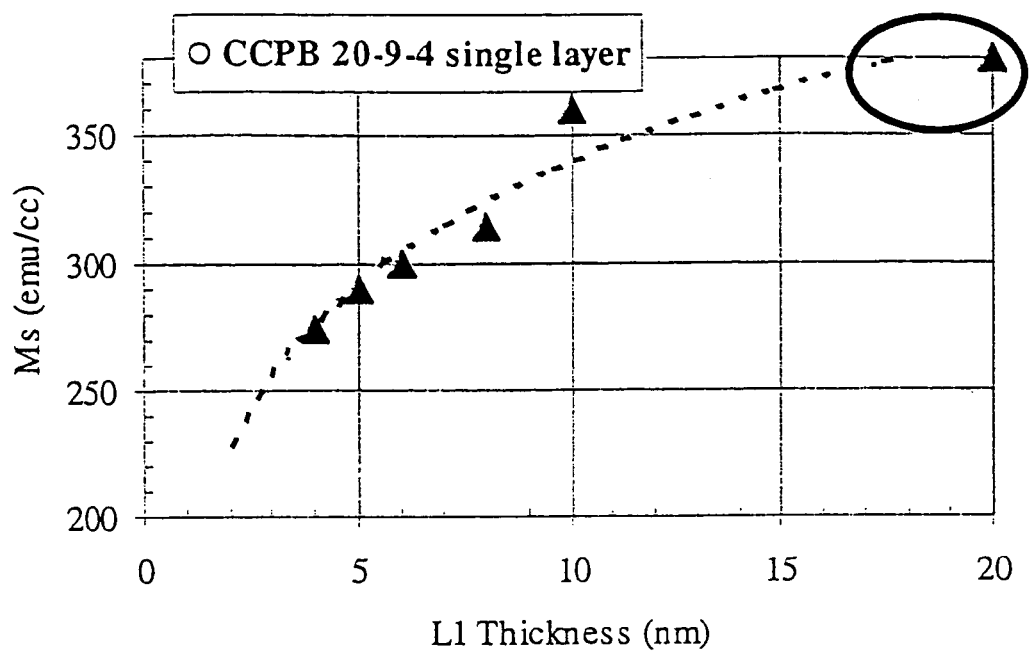
FIG. 11 is a diagram showing magnetization values of CCPB systems when the thickness of the superparamagnetic layer is increased.
Figure 12:
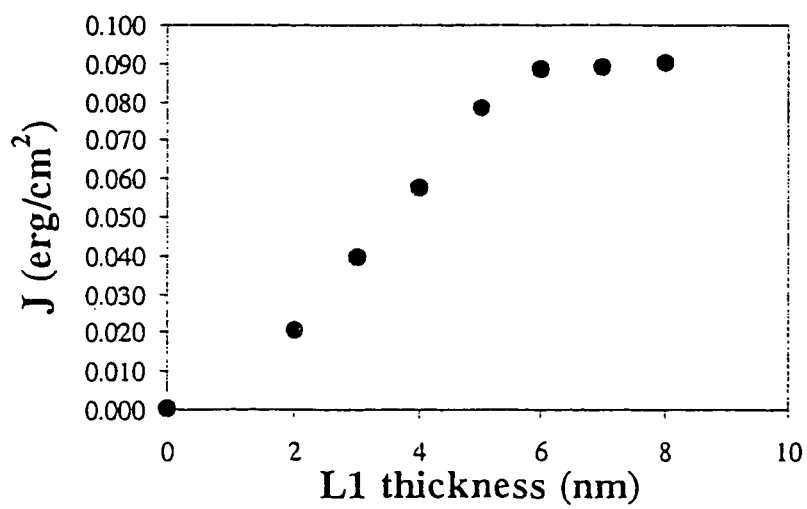
FIG. 12 is a diagram showing exchange coupling strength values of CCPB systems when the thickness of the superparamagnetic layer is increased.

Coercivity values in the above described region also would be zero as obtained from the single layer magnetic measurements shown in FIGS. 11 and 12. FIG. 11 is a diagram showing magnetization values of CCPB systems when the thickness of the superparamagnetic layer is increased. In FIG. 11, the ordinate indicates the magnetization Ms (emu/cc), and the abscissa indicates the thickness (nm) of the bottom magnetic layer, that is, the superparamagnetic layer (or stabilizing layer). FIG. 12 is a diagram showing exchange coupling strength values of CCPB systems when the thickness of the superparamagnetic layer is increased. In FIG. 12, the ordinate indicates the antiferromagnetic exchange coupling strength J (erg/cm$^2$), and the abscissa indicates the thickness (nm) of the bottom magnetic layer, that is, the superparamagnetic layer (or stabilizing layer). The reduction in the magnetization Ms shown in FIG. 11 reduces exchange coupling strength J shown in FIG. 12, between two magnetic layers.

Figure 13:
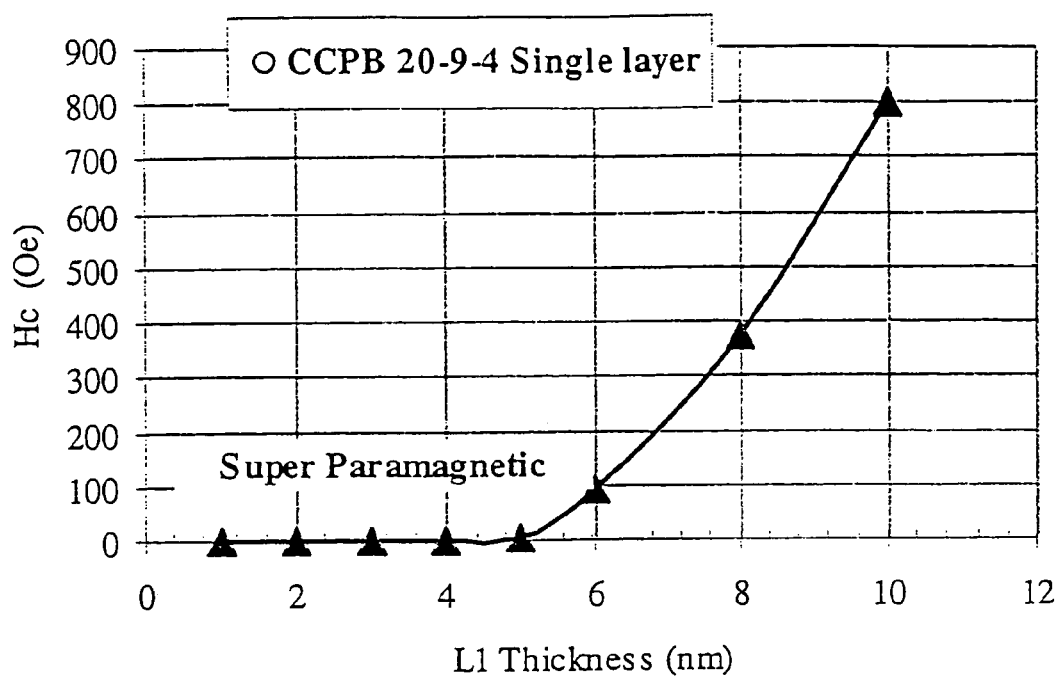
FIG. 13 is a diagram showing an improvement of coercivity when the thickness of the superparamagnetic layer is increased.

FIG. 13 is a diagram showing an improvement of coercivity of the CCPB systems when the thickness of superparamagnetic layer is increased. In FIG. 13, the ordinate indicates the coercivity Hc (Oe), and the abscissa indicates the thickness (nm) of the bottom magnetic layer, that is, the superparamagnetic layer (or stabilizing layer).

Even though the retentivity of the superparamagnetic layer is zero, at remanence state of the synthetic ferrimagnetic structure, the bottom magnetic layer which is the superparamagnetic layer and functions as the stabilizing layer, is in a reverse saturated state. Hence, a reduction of the remanence magnetization and thickness product Mrt would always exist. Since there is not much change or only a slight increase in the coercivity Hc for the superparamagnetic layer thickness of approximately 6 nm or less, overwrite values are unaffected by introducing such superparamagnetic layers.

Figure 14:
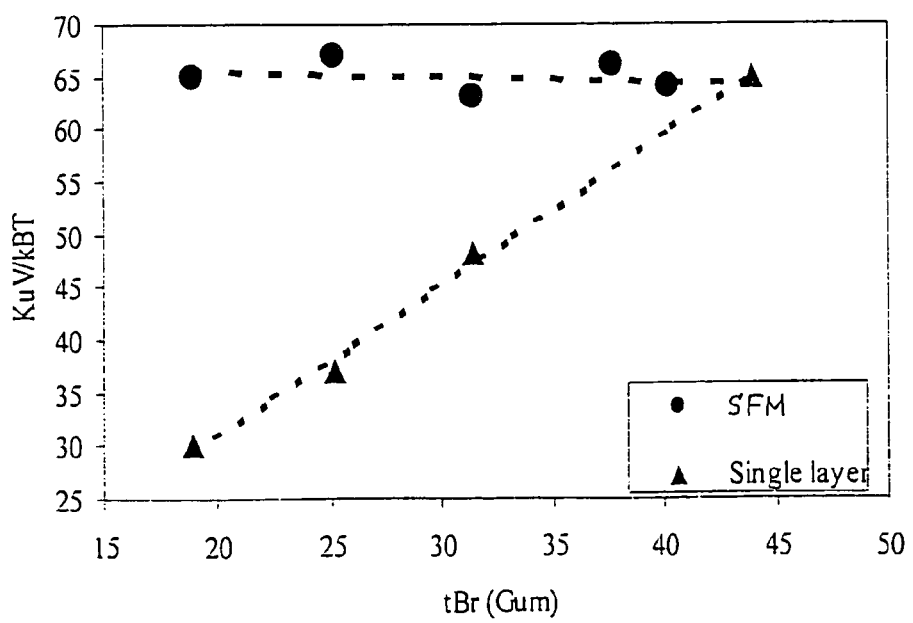
FIG. 14 is a diagram showing an improvement of thermal stability when the exchange coupling strength values are increased corresponding to the increase in the ferromagnetic layer thickness.

FIG. 14 is a diagram showing an improvement of thermal stability when the antiferromagnetic exchange coupling strength values are increased corresponding to the increase in the ferromagnetic layer thickness in the SFM having the synthetic ferrimagnetic structure proposed in the Japanese Laid-Open Patent Application No.2001-56924. In FIG. 14, the ordinate indicates the $K_uV/k_BT$ value, and the abscissa indicates the $tB_r$ value (Gµm). "●" indicates the $K_uV/k_BT$ value for the SFM, and for comparison purposes, "▼"

indicates the $K_uV/k_BT$ for the conventional single layer medium having a recording layer made up of a single magnetic layer.

Figure 15:
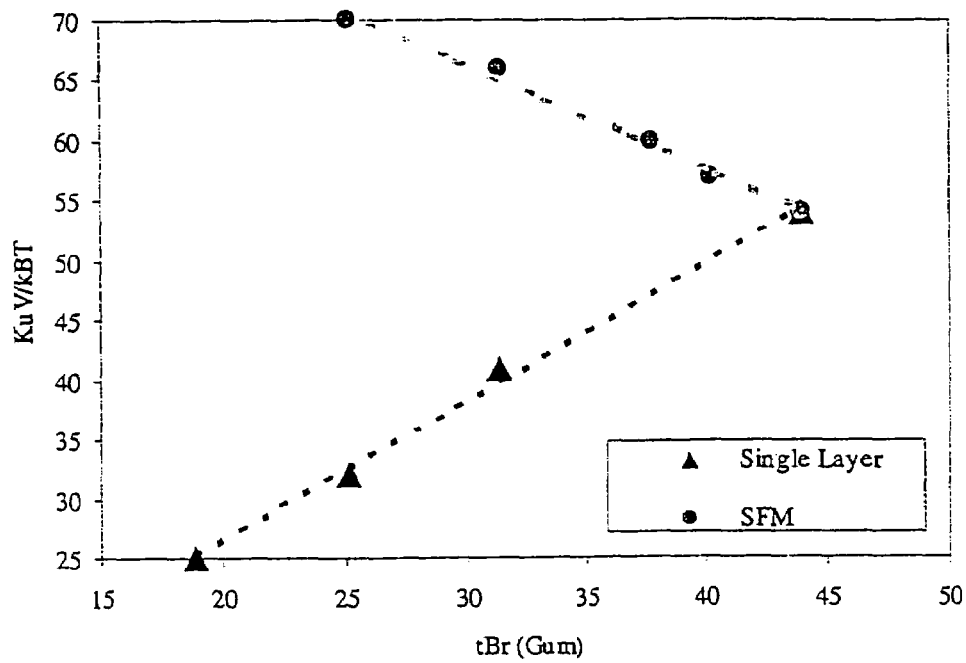
FIG. 15 is a diagram showing an improvement of the thermal stability when the exchange coupling strength values are increased corresponding to the increase in the superparamagnetic layer thickness.

FIG. 15 is a diagram showing an improvement of thermal stability when the antiferromagnetic exchange coupling strength values are increased corresponding to the increase in the superparamagnetic layer thickness in the first embodiment of the magnetic recording medium having the synthetic ferrimagnetic structure. In FIG. 15, the ordinate indicates the $K_uV/k_BT$ value, and the abscissa indicates the $tB_r$ value (Gμm). "○" indicates the $K_uV/k_BT$ value for the first embodiment of the magnetic recording medium, and for comparison purposes, "▼" indicates the $K_U/k_BT$ for the conventional single layer medium having a recording layer made up of a single magnetic layer.

The SNR can be kept at approximately the same level as or, can be increased compared to, the SFM proposed in the Japanese Laid-Open Patent Application No.2001-56924, by suitable selection of the superparamagnetic layer. From the investigations made by the present inventor, including the results shown in FIGS. 14, 15 and 16, it was confirmed that the $K_U/k_BT$ value increases when the bottom magnetic layer, that is, the superparamagnetic layer (stabilizing layer), is made of Co alloys containing Pt, such as CoCrPtB, CoCrPt, CoCrPtTa, CoCrPtTaB and CoCrPtBCu, where the Cr content 5 at. % to 40 at. %, Pt content is 8 at. % to 16 at. %, B content is 0 to 15 at. %, Cu content is 0 to 6 at. %, and the remaining content is Co. It was also confirmed that the Pt content of the Co alloys may be 0 for the above composition ranges. In other words, the superparamagnetic layer may be made of Co alloys such as CoCrB, CoCr, CoCrTa, CoCrTaB, and CoCrBCu, with Cr content of 5 at. % to 40 at. %, B content of 0 to 15 at. %, Cu content of 0 to 6 at. %, and the remaining content is Co.

Furthermore, it was confirmed that the $K_U/k_BT$ values remain the same when the bottom magnetic layer, that is, the superparamagnetic layer (stabilizing layer), is made of high magnetization Co alloys without Pt or B, such as CoCr, CoCrB, CoCrTa and CoCrTa, where the Cr content is 5 at. % to 20 at. %, the B content is 0 to 10 at. %, and the remaining content is Co. In this case, the remanent magnetization and thickness product Mrt decreased by the high magnetization and low anisotropic properties of the bottom magnetic layer.

Figure 16:
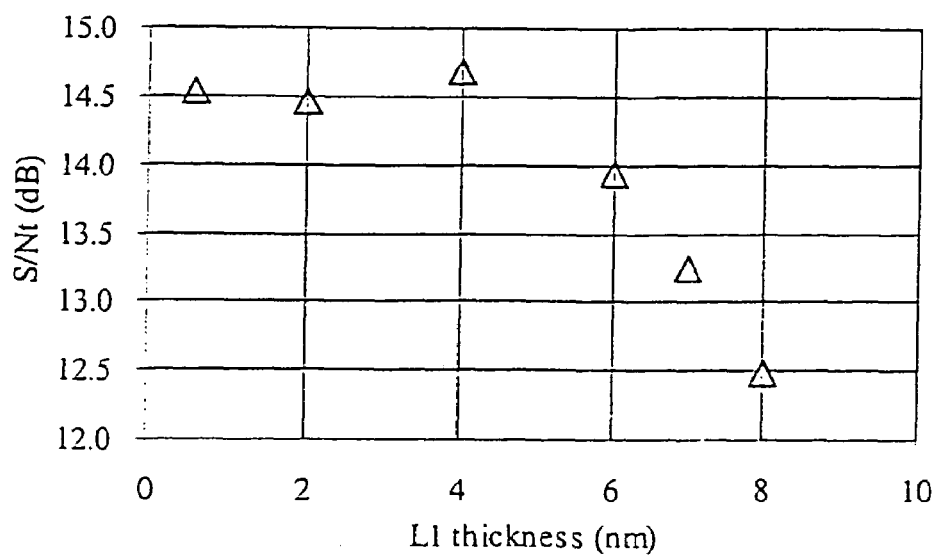
FIG. 16 is a diagram showing a total signal-to-noise ratio when the thickness of the superparamagnetic layer is increased.

FIG. 16 is a diagram showing a total signal-to-noise ratio (SNR) when the thickness of the superparamagnetic layer is increased. In FIG. 16, the ordinate indicates the total SNR S/Nt (dB), and the abscissa indicates the thickness of the bottom magnetic layer, that is, the superparamagnetic layer (stabilizing layer). It was confirmed that the S/Nt improves as the superparamagnetic layer thickness is increased up to approximately 6 nm, but thereafter decreases as the superparamagnetic layer thickness is further increased beyond approximately 6 nm, and becomes ferromagnetic. Hence, in this case, it may be seen that it is further desirable that the superparamagnetic layer thickness is approximately 6 nm or less.

The material selection of magnetic layers of the synthetic ferrimagnetic structure, which function as the stabilizing layer, can be made from Co alloys such as CoCrPtB. However, in total there are two types of stabilizing layers which are possible in general as mentioned above. Depending on the anisotropy and magnetic moment values of stabilizing layer, stability and improvements in the SNR can be achieved.

Figure 17:
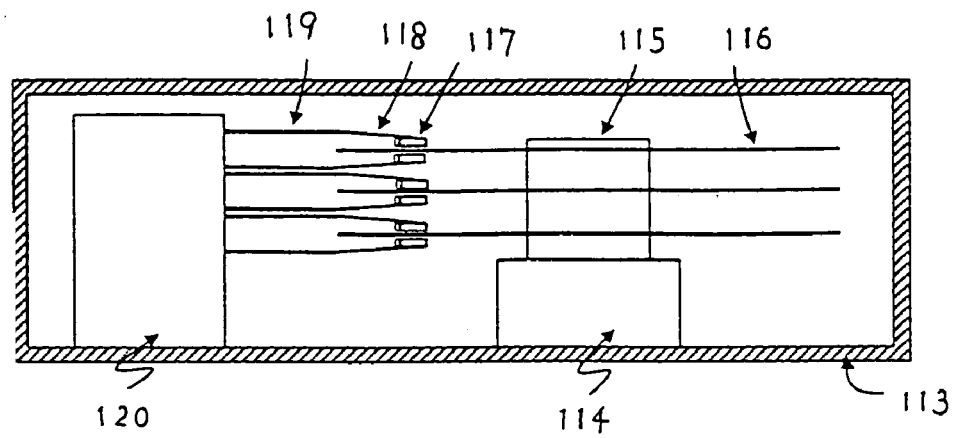
FIG. 17 is a cross sectional view showing an important part of this embodiment of the magnetic storage apparatus.

Next, a description will be given of an embodiment of a magnetic storage apparatus according to the present invention, by referring to FIGS. 17 and 18. FIG. 17 is a cross sectional view showing an important part of this embodiment of the magnetic storage apparatus, and FIG. 18 is a plan view showing the important part of this embodiment of the magnetic storage apparatus.

Figure 18:
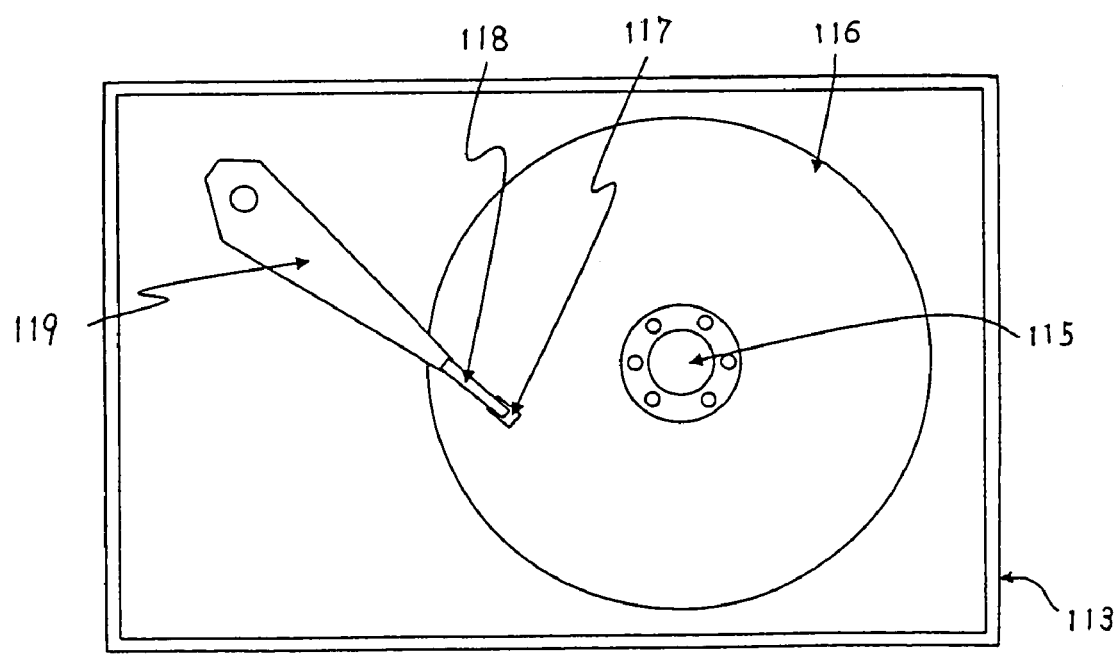
FIG. 18 is a plan view showing the important part of this embodiment of the magnetic storage apparatus.

As shown in FIGS. 17 and 18, the magnetic storage apparatus generally includes a motor 114, a hub 116, a plurality of magnetic recording media 116, a plurality of recording and reproducing heads 117, a plurality of suspensions 118, a plurality of arms 119, and an actuator unit 120 which are provided within a housing 113. The magnetic recording media 116 are mounted on the hub 115 which is rotated by the motor 114. The recording and reproducing head 117 is made up of a reproducing head such as a MR or GMR head, and a recording head such as an inductive head. Each recording and reproducing head 117 is mounted on the tip end of a corresponding arm 119 via the suspension 118. The arms 119 are moved by the actuator unit 120. The basic construction of this magnetic storage apparatus is known, and a detailed description thereof will be omitted in this specification.

This embodiment of the magnetic storage apparatus is characterized by the magnetic recording media 116. Each magnetic recording medium 116 has the structure of any of the embodiments described above in conjunction with FIGS. 1 and 4–6. The number of magnetic recording media 116 is not limited to three and only on two or four or more magnetic recording media may be provided.

The basic construction of the magnetic storage unit is not limited to that shown in FIGS. 17 and 18. In addition, the magnetic recording medium used in the present invention is not limited to a magnetic disk.

Further, the present invention is not limited to these embodiments, but various variations and modifications may be made without departing from the scope of the present invention.

What is claimed is:

1. A magnetic recording medium comprising:
   a base structure; and
   a synthetic ferrimagnetic structure, disposed on said base structure, and forming a recording layer,
   said synthetic ferrimagnetic structure including at least a bottom magnetic layer and a top magnetic layer which are antiferromagnetically coupled via a nonmagnetic spacer layer,
   wherein said bottom magnetic layer is made of a superparamagnetic layer, satisfying $KuV/k_BT<25$, where Ku is an anisotropy constant, V is a volume, T is a temperature of the superparamagnetic layer, and $k_B$ is Boltzmann's constant, and said top magnetic layer is made of a ferromagnetic material, and
   magnetic moment orientations of said bottom and top magnetic layers are antiparallel at a remanent state where an external applied magnetic field is zero, wherein said bottom magnetic layer is located nearest said base structure and is superparamagnetic above 273 K.

2. The magnetic recording medium as claimed in claim 1, wherein said synthetic ferrimagnetic structure further includes an other magnetic layer and an other nonmagnetic spacer layer which are successively stacked and interposed between said nonmagnetic spacer layer and said top magnetic layer, said other magnetic layer being made of a superparamagnetic layer.

3. The magnetic recording medium as claimed in claim 1, wherein said synthetic ferrimagnetic structure further includes an other magnetic layer and an other nonmagnetic coupling layer which are successively stacked and interposed between said base structure and said bottom magnetic layer, said other magnetic layer being made of a ferromagnetic material.

4. The magnetic recording medium as claimed in claim 1, wherein said synthetic ferrimagnetic structure further includes an other magnetic layer and an other nonmagnetic spacer layer which are successively stacked and interposed between said nonmagnetic layer and said top magnetic layer, said other magnetic layer being made of a ferromagnetic material.

5. The magnetic recording medium as claimed in claim 1, wherein said base structure includes a substrate, a seed layer which is disposed on said substrate and gives predominantly a (002) texture, and a nonmagnetic underlayer which is disposed on said seed layer and made of a BCC metal or alloys thereof.

6. The magnetic recording medium as claimed in claim 5, wherein said base structure further includes a nonmagnetic Co-containing intermediate layer which is disposed on said underlayer and gives predominantly a (11–20) texture.

7. The magnetic recording medium as claimed in claim 1, wherein the superparamagnetic layer is selected from a group consisting of hard magnetic materials and soft magnetic materials.

8. The magnetic recording medium as claimed in claim 1, wherein said bottom magnetic layer has a thickness t in a range of 0<t<10 nm depending on the superparamagnetic layer used.

9. The magnetic recording medium as claimed in claim 1, wherein said bottom magnetic layer is made of Co alloys containing Pt, selected from a group consisting of CoCrPtB, CoCrPt, CoCrTa, CoCrPtTa, CoCrPtTaB, and CoCrPtBCu, with Cr content of 5 at. % to 40 at. %, Pt content of 8 at. % to 16 at. %, B content of 0 to 15 at. %, Cu content of 0 to 6 at. %, and a remaining content is Co.

10. The magnetic recording medium as claimed in claim 1, wherein said bottom magnetic layer is made of Co alloys selected from a group consisting of CoCrB, CoCr, CoCrTa, CoCrTaB, and CoCrBCu, with Cr content of 5 at. % to 40 at. %, B content of 0 to 15 at. %, Cu content of 0 to 6 at. %, and a remaining content is Co.

11. The magnetic recording medium as claimed in claim 1, wherein said bottom magnetic layer is made of high magnetization Co alloys without Pt or B, selected from a group consisting of CoCr, CCrB, CoCrTa and CoCrTa, where the Cr content is 5 at. % to 20 at. %, the B content is 0 to 10 at. %, and a remaining content is Co.

12. The magnetic recording medium as claimed in claim 1, wherein said nonmagnetic spacer layer is made of a material selected from a group consisting of Ru, Rh, Ir, Cr, Mo, Nb, Ta, Cu, Re and alloys thereof.

13. The magnetic recording medium as claimed in claim 1, wherein an antiferromagnetic coupling exists between the superparamagnetic and the ferromagnetic grains on top and bottom magnetic layers.

14. The magnetic recording medium as claimed in claim 1, wherein said top magnetic layer experiences an exchange field of few hundred Oe or higher from said bottom magnetic layer due to an antiferromagnetic coupling.

15. A magnetic storage apparatus comprising:
at least one magnetic recording medium having a base structure, and a synthetic ferrimagnetic structure disposed on said base structure and forming a recording layer, where said synthetic ferrimagnetic structure includes at least a bottom magnetic layer and a top magnetic layer which are antiferromagnetically coupled via a nonmagnetic spacer layer, said bottom magnetic layer is made of a superparamagnetic material satisfying $KuV/k_BT<25$, where Ku is an anisotropy consyant, V is a volume, T is a temperature of the superparamagnetic layer, and $k_b$ is Boltzmann's constant, , said top magnetic layer is made of a ferromagnetic material, and magnetic moment orientations of said bottom and top magnetic layers are antiparallel at remanent state where an external applied magnetic field is zero; and
a transducer which writes information on and reproduces information said magnetic recording medium, wherein said bottom magnetic layer is located nearest said base structure and is superparamagnetic above 273 K.

16. The magnetic storage apparatus as claimed in claim 15, wherein the synthetic ferrimagnetic structure of said magnetic recording medium further includes an other magnetic layer and an other nonmagnetic spacer layer which are successively stacked and interposed between said nonmagnetic spacer layer and said top magnetic layer, said other magnetic layer being made of a superparamagnetic layer.

17. The magnetic storage apparatus as claimed in claim 15, wherein the synthetic ferrimagnetic structure of said magnetic recording medium further includes an other magnetic layer and an other nonmagnetic coupling layer which are successively stacked and interposed between said base structure and said bottom magnetic layer, said other magnetic layer being made of a ferromagnetic material.

18. The magnetic storage apparatus as claimed in claim 15, wherein the synthetic ferrimagnetic structure of said magnetic recording medium further includes an other magnetic layer and an other nonmagnetic spacer layer which are successively stacked and interposed between said nonmagnetic layer and said top magnetic layer, said other magnetic layer being made of a ferromagnetic material.

* * * * *

UNITED STATES PATENT AND TRADEMARK OFFICE
CERTIFICATE OF CORRECTION

| | |
|---|---|
| PATENT NO. | : 7,074,508 B2 |
| APPLICATION NO. | : 10/914960 |
| DATED | : July 11, 2006 |
| INVENTOR(S) | : Ajan |

It is certified that error appears in the above-identified patent and that said Letters Patent is hereby corrected as shown below:

In the Claims:

Col. 13, line 46, delete "CCrB" and insert --CoCrB--.

Col. 14, line 19, delete "consyant" and insert --constant--.

Signed and Sealed this

Twenty-sixth Day of December, 2006

JON W. DUDAS
*Director of the United States Patent and Trademark Office*